United States Patent [19]

Jenkins

[11] 4,348,287

[45] Sep. 7, 1982

[54] ZIRCONIUM COMPOUNDS AS FLOTATION AID

[75] Inventor: Fred W. Jenkins, St. Louis, Mo.

[73] Assignee: Petrolite Corporation, St. Louis, Mo.

[21] Appl. No.: 266,775

[22] Filed: May 26, 1981

[51] Int. Cl.$^3$ .............................................. C02F 1/24
[52] U.S. Cl. .................................... 210/705; 210/728; 210/734; 210/DIG. 5; 209/9; 209/166
[58] Field of Search .................... 209/9, 166; 210/702, 210/704, 705, 706, 707, 724, 725, 726, 727, 764, DIG. 5, 728, 734

[56] References Cited

U.S. PATENT DOCUMENTS

| | | | |
|---|---|---|---|
| 2,740,522 | 4/1956 | Aimone | 210/705 |
| 3,054,746 | 9/1962 | Gaden | 210/704 |
| 3,203,968 | 8/1965 | Sebba | 210/705 |
| 3,234,075 | 2/1966 | Braitberg | 210/764 |
| 4,141,691 | 2/1979 | Antonetti | 210/705 |
| 4,168,229 | 9/1979 | Chambers | 210/DIG. 5 |
| 4,191,727 | 3/1980 | Brugger | 209/9 |

FOREIGN PATENT DOCUMENTS

| | | | |
|---|---|---|---|
| 2312457 | 5/1976 | France | 210/705 |
| 51-78066 | 7/1976 | Japan | 210/705 |

*Primary Examiner*—Ernest G. Therkorn
*Attorney, Agent, or Firm*—Sidney B. Ring; Hyman F. Glass

[57] ABSTRACT

This invention relates to the use of zirconium compounds and complexes thereof as flotation aids in a wide variety of systems.

18 Claims, No Drawings

ZIRCONIUM COMPOUNDS AS FLOTATION AID

This invention relates to the use of zirconium compounds as flotation aids.

Heretofore, zirconium compounds have been employed in treating waste water in the paper industry, for example U.S. Pat. Nos. 3,997,439 and 4,066,542. Additional publications describe "Clay Stabilization During Fractioning Treatments with Hydrolyzable Zirconium Salts" by F. W. Peters and C. M. Stout in J. of Petroleum Technology, February 1977, pp. 187-194.

In U.S. application Ser. No. 146,837 filed May 5, 1980, there is disclosed and claimed the uses of organo zirconium complexes in resolving emulsions.

I have now discovered that the compositions disclosed and claimed in U.S. application Ser. No. 146,837 can also be employed as flotation aids in a wide variety of systems.

I have also discovered that zirconium compounds themselves (as distinguished from zirconium complexes) are also useful as flotation aids.

Any water soluble zirconium salt which can form zirconium oxygen bonds, for example, the tetramer $Zr(OH)_2 \cdot 4H_2O)_4$ in aqueous solution can be used in this invention, for example halides such as chloride, etc., nitrate, sulfate, acetate or zirconyl salts thereof. However, zirconyl chloride or zirconium oxychloride $ZrOCl_2 \cdot H_2O$ is the most convenient and economical form thereof.

The organic compounds which complex with zirconium compounds are disclosed in Ser. No. 146,837 and include a wide variety of organic compounds alone or in combination with metals such as zinc, aluminum, iron or calcium. Typical examples of organic compounds employed as demulsifiers are found in the following:

U.S. Pat. No. 2,407,895—Polymerized Alkanolamines & Derivatives
U.S. Pat. No. Re. 22,963—(Reissue of U.S. Pat. No. 2,407,895)
U.S. Pat. No. 3,009,884—Acylated Oxyalkylated Polyamines
U.S. Pat. No. 3,090,759—Polyacrylamides
U.S. Pat. No. 3,200,106—Derivatives of Branched Polyamines
U.S. Pat. No. 3,344,083—Derivatives of Polyethyleneimines The ratio of organic compound to zirconium compound calculated as 100% non-hydrated $ZrOCl_2$ can vary widely depending on the particular organic compound, the particular system, etc. In general, the weight ratio of organic compound to zirconium compound may vary from about 0.5 to 8, such as from about 0.75 to 5, for example from about $1 \pm 0.2$, but peferably about 1 to 1.

Although I do not wish to be bound by theoretical consideration, the compositions of this invention are believed to be amino-zirconium complexes, possibly in the form of quaternary amino-zirconium complexes ideally expressed as $(N) \cdot (Zr)$ or as the quaternary $(N) \cdot (Zr) \ X^{\ominus}$ where $(N)$ is the amine moiety, $(Zr)$ is the zirconium-containing moiety and X is an anion. Therefore, the compositions of this invention may be chemically combined entities as well as chemical mixtures. Acid often facilitates the formation of the complex.

Any suitable organic compound can be employed. The most preferable organic compounds are cationic. Suitable organic compounds are derived from compositions containing a plurality of amino groups.

The following are illustrative:

(1) Polalkanolamines such as polyethanolamines such as illustrated in U.S. Pat. No. 2,407,895 and esters thereof
(2) Polyalkylene polyamines
(3) Polyethyleneimines
(4) Polymerized acrylates containing amino groups, for example, Polymerized dimethylaminoethylmethacrylate
(5) Polymerized polyalkyleneamines, such as the reaction product of alkylene dihalides with polyalkylenediamines
(6) Polymerized vinyl pyridines and alkyl pyridines.

The above demulsifiers containing a plurality of amino groups are preferably employed as quaternaries.

For example any of the aove polyamines can be quaternized with any alkyl halide or polyalkyl halide, etc.

Suitable alkyl halides include alkyl groups having from 1 to 18 carbons, but preferably lower alkyl groups, i.e., from 1 to 8 carbons, methyl, ethyl, propyl, etc. chlorides.

Dihalides include alkylene dichlorides, etc., ether-containing dihalides such as $ClCH_2CH_2OCH_2CH_2Cl$, unsaturated dihalides such as $Cl-CH_2-CH=CHCH_2-Cl$, etc.

The following compositions may be employed:

A—49% solution of heat polymerized partial ester, i.e. the partial acetic ester of triethanolamine exhaustively quaternized with methyl chloride.

B—Commercially available 20% solution of zirconyl-chloride (calculated as $ZrOCl_2$).

C—32% solution of heat polymerized triethanolamine.

D—Natron 88 is Polyacrylate material reacted with ethylene-imine and acidified with nitric acid (National Starch).

E—53.5% soluton of A

F—A blended mixture of 1 part/wgt of Natron 88 and 4 parts/wgt A

G—A blended mixture of 32%/wgt of C and 61%/wgt of a 62% zinc chloride solution

H—80% wgt blended mixture of A and 20% wgt of a 20%/wgt zirconylchloride solution (B)

I—42%/wgt blended mixture of A and 42%/wgt of a 20%/wgt zirconylchloride solution (B)

J—26%/wgt blended mixture of A and 51%/wgt of a 20%/wgt zirconylchloride solution (B)

K—32%/wgt blended mixture of A and 64%/wgt of a 20%/wgt zirconylchloride solution (B)

L—20%/wgt blended mixture of E and 80%/wgt of a 20%/wgt zirconylchloride solution (B)

M—Equal parts by wgt of a 30% commercial polyethyleneimine and B.

In the above $ZrOCl_2$ is calculated as non-hydrated $ZrOCl_2$. The $ZrOCl_2$ employed is a 20% weight solution obtained from Magnesium Elektron, Inc., Flemington, N.J. 0822.

The above examples were formed by blending the organic compound with a commercial 20% weight solution of $ZrOCl_2$. In most instances a solution of the organic compound and $ZrOCl_2$ was formed on mixing. If separation occurs, a small amount of acid (HCl) promotes a clear solution.

The compositions of this invention are particularly effective in flotation systems.

REMOVAL OF OILS AND SOLIDS FROM AQUEOUS SYSTEMS

In the present process, to remove oils, or solids, or combinations thereof, from aqueous systems, the reagent is introduced at any convenient point in the system, and it is mixed with the oils or solids in any desired manner, such as by being pumped or circulated through the system or by mechanical agitation such as paddles or by gas agitation. After mixing, the mixture of oils or solids and reagent is allowed to stand quiescent until the constituent phases of the emulsion separate. Settling times and optimum mixing times will, of course, vary with the nature of the oil or solid and the apparatus available. The operation, in its broadest concept, is simply the introduction of the reagent into the oils or solids, the mixing of the two to establish contact and promote coalescence, and, usually, the subsequent quiescent settling of the agitated mixture, to produce the aqueous and non-aqueous phases as stratified layers.

Agitation may be achieved in various ways. The piping system through which the oil- or solids-containing system passed during processing may itself supply sufficient turbulence to achieve adequate mixing of reagent and system. Baffled pipe may be inserted in the flow sheet to provide agitation. Other devices such as perforated-chamber mixers, excelsior- or mineral- or gravel- or steel-shaving-packed tanks, beds of stone or gravel or minerals in open ducts or trenches may be employed beneficially to provide mixing. The introduction of a gas, such as natural gas or air, into a tank or pipe in which or through which the mixture of reagent and system is standing or passing is frequently found suitable to provide desired agitation.

It has been found that the factors, reagent feed rate, agitation, and settling time are somewhat interrelated. For example, with sufficient agitation of proper intensity the settling time required can be materially shortened. On the other hand, if agitation is relatively non-procurable but extended settling time is, the process may be equally productive of satisfactory results. The reagent feed rate has an optimum range, which is sufficiently wide, however, to meet the tolerances required for the variances encountered daily in commercial operations.

Application of a suitable gas in a procedure approximating that of the froth flotation cell employed in ore beneficiation, after the present reagent has been added to the system to be resolved, frequently has a favorable influence of totally unexpected magnitude. By incorporating the step of subjecting the chemicalized (i.e., containing the reagent) system to the action of air in a sub-aeration type flotation cell, a clear aqueous layer is sometimes obtained in a matter of seconds, without added quiescent settling and with approximately as much reagent. Natural gas was found to be as good a gaseous medium as was air, in this operation.

It sould be distinctly understood that such aeration technique, while an important adjunct to the use of the present reagent, in some cases, is not an equivalent procedure. This may be proved by subjecting an un-chemicalized system to aeration for a period of minutes without detectable favorable effect. Addition of the reagent to such aerated system will produce resolution, promptly.

The details of the mechanical structures required to produce aeration suitable for the present purpose need not be given here. It is sufficient to state that any means capable of producing small gas bubbles within the body of the system is acceptable for use.

The flotation principle has long been employed in the beneficiation of ores. Many patents in this art illustrate apparatus suitable for producing aeration of liquids. Reference is made to Taggart's "Handbook of Ore Dressing," which describes a large number of such devices.

Suitable aeration is sometimes obtainable by use of the principle of Elmore, U.S. Pat. No. 826,411. In that ore beneficiation process, an ore pulp was passed through a vacuum apparatus, the application of vacuum liberating very small gas bubbles from solution in the water of the pulp, to float the mineral. A more recent application of this same principle is found in the Door "Vacuator."

The manner of practicing the present invention using aeration is clear from the foregoing description.

The order in which the compositions of this invention and the aeration step are applied is relatively immaterial. Sometimes it is more convenient to chemicalize the system and subsequently to apply the aeration technique. In others, it may be more advantageous to produce a strongly frothing system and then introduce the compositions into such aerated system.

Any desired gas can be substituted for air. Other commonly suitable gases include natural gas, nitrogen, carbon dioxide, oxygen, etc., the gas being used essentially for its levitation effect. If any gas has some deleterious effect on any component of the system, it will obviously be desirable to use instead of some other gas which is inert under the conditions of use.

The amount of compositions of this invention used will vary depending on the particular composition, the particular system, etc. In general, the amount of composition employed in the system is at least about 0.5 ppm, such as from about 1.0 to 60 ppm, for example from about 5 to 40 ppm, but preferably from about 3.0 to 30 ppm. Larger amounts may be used but there is generally no cost/performance reason for so doing.

WEMCO Depurator Flotation Machine is a flotation machine for removal of emulsified oily wastes and suspended solids from petroleum industry wastewater.

The WEMCO Depurator unit employs mechanically-induced air flotation to separate solids, oils, or organic materials from refinery or oil field effluent in larger volumes, in less space, and at lower cost than any other machine. It can clean large quantities of wastewater containing from 200 to 5,000 ppm of oil, depending on the type of oil and emulsion. In most applications, less than 10 ppm of oil remain after a four-minute cleaning cycle.

It is available in a variety of sizes to handle from 1,720 to 171,000 barrels of wastewater per day. Depurator machines can be installed at costs 15–40% less than other comparator flotation equipment. Maintenance costs are lower, too. The Depurator unit also requires at least 50% less space than comparable equipment for its volume capacity. Over 300 successful field installations to date.

WEMCO Depurator units are composed of four standard WEMCO flotation cells. Each cell is equipped with a motor-driven self-aerating rotor mechanism. As the rotor spins, it acts as a pump, forcing water through a disperser and creating a vacuum in the standpipe. The vacuum pulls gas into the standpipe and thoroughly mixes it with the wastewater. As the gas/water mixture travels through the disperser at high velocity, a shearing force is created, causing the gas to form minute bubbles. Oil particles and suspended solids attach to the gas bubbles as they rise to the surface. The oil and suspended solids gather in a dense froth on the surface, are removed from the cell by skimmer paddles and collected in external launders.

In the majority of applications, natural gas or nitrogen is used to form the bubbles. The absence of oxygen prevents the growth of harmful bacteria and also reduces downstream corrosion. A pressure of 0.50 to 1.0 ounce maintains a gas blanket between the liquid level and gas-tight cover. When air is used, it is induced by the Depurator machine at atmospheric pressure. Self-induced mechanical air flotation eliminates need for auxiliary air compressors or blowers.

Processing is often improved with the aid of a chemical injected into the water upstream from the float cell. These compounds break oil-in-water emulsions, gather suspended solids, and stabilize the air bubbles to promote froth flotation.

The Depurator machine consists of a self-supporting, all-steel skid-mounted tank, with integral float-collecting flumes and gas-tight covers. Tank interior is high-temperature epoxy coated for greatest corrosion resistance. Inspection doors are provided on both sides of the tank, plus a breather valve and pneumatic liquid level controller.

Each standpipe is equipped with gas intake ports beneath the gas-tight cover. A spearate motor powers each rotor/disperser mechanism. Two ¼ horsepower gearmotors drive the simmer assemblies. All motors are explosion-proof, 3 phase, 60 cycles, 230/460 volt.

The following are the major petroleum industry applications.

REFINERY PROCESS WATER

At the refinery, the Depurator wastewater treatment generally follows gravity oil-water separation. The wastewater includes process water from desalters, tank and water drawoffs, steam stripping condensate, pump gland cooling, barometric condenser, treating plant wash, caustic treatment, and loading facility washdown. It may also include storm run-off water.

The Depurator device is first choice for secondary wastewater treatment because, unlike gravity oil-water separators, it will break emulsions with appropriate chemical additives. More than a dozen successful installations are currently in refinery operation.

PETROCHEMICAL WASTEWATER

Wastewater created in the production of bulk chemicals derived from natural gas or petroleum is often distinguished from the usual oil refinery product by special characteristics. No single oil/water separation method has proven capable of handling all the compounds produced. The flotation process, as employed by the WEMCO Depurator machine, has proven to be the best wastewater treatment for many of these oils and suspended solids. Bench tests are recommended for each specific application.

BALLAST WATER

Rarely is it possible to discharge water directly into the bay or waterway from ballast water storage tanks. Depurator units take the water from the storage tank and make the precise oil-water separation necessary to meet government clean water standards. Depurator flotation machines, with appropriate content of ballast water to lower levels than any other flotation process.

OIL FIELD PRODUCTION WATER

The Depurator machine wrings almost the final drops of oil from produced water. After initial treatment by gravity oil/water separators, such as free water knockouts, gun barrels and skim tanks, oilfield water can be terminally cleaned to most community and company standards by the WEMCO Depurator machine. Depurator units will remove the emulsified oil left by preliminary water treatment which could prevent formation plugging and reduce pump efficiency when the water is to be reinjected for water flooding. For steam flooding, the Depurator unit is used ahead of boiler pretreatment equipment.

If the wastewater is to be disposed of by percolation ponds, or returned to existing waterways, the Depurator machine has consistently proven its ability to clean the water to local, state and federal standards.

The present invention may be used successfully as a flotation aid with various methods of sewage treatment, such as sludge filtration, or digested sludge filtration, activated sludge, or other methods of sewage treatment in which a settling or filtration step is used.

The amount of zirconium compound used in this invention can vary widely depending on many factors, such as the system treated, the particular zirconium compound, the zirconium complex employed, etc. In general, one employs sufficient zirconium compound to achieve the desired results, such as at least about 0.5 ppm, for example from about 0.5 to 300 ppm, such as from about 1 to 200 ppm, but preferably from about 2 to 50 ppm. Greater amounts may be employed in certain instances, but there is generally no commercial advantages in employing more than the required amount.

The following examples are presented for purposes of illustration and not of limitation.

JACKSON TURBIDITY MEASUREMENTS TEST

Flotation results are measured by using a modified Jackson turbidity procedure. A 100 ml graduated cylinder is filled with water to be evaluated. A ½ inch wide stainless steel strip about 13 inches long with one end bent to form a ½ inch square viewing area is slowly immersed into the liquid in the graduated cylinder until the ½ inch square end, previously blackened with black paint, is just barely visible. The point where the surface of the water intersects the stem of the metal strip is read directly in Jackson turbidity units. The calibrations on the stick are derived from standard turbidity suspensions as outlined in "Manual on Industrial Water and Industrial Waste Water", 2nd Ed., 1966 printing, ASTM Designation D-1889-66 on p. 669. The lower the JTU reading, the less turbid the solution is and the less are the impurities in the water.

The following formulations were employed in the Test:

Formulation A:
15% poly DMAEMA (10% active)
50% zirconyl chloride (20% active)
35% water
DMAENA is: Dimethylaminoethylmethacrylate Formulation B:
20% zirconyl chloride The underflow was measured in Jackson Turbidity units (JTU) as measured by the visual dip stick method. Thus, the lower the number the better the water and the reagent employed. 90/150 means that the recovered clear water was 90 turbidity units down from an untreated (raw) turbidity of 150.

The test apparatus used was the laboratory model of a WELCO Nozzle-Air machine in which the air is induced by a high velocity water stream acting as a suction pump and pulling the air into the stream of water, thus creating bubbles of air for flotation.

The results are given in the following table.

| | | Nozzle-Air Depurator Test | | | | |
|---|---|---|---|---|---|---|
| | | 10 lb Recirculation Pressure | | Air | | Under- |
| Reagent | ppm | Condition Time—Min | Flotation Time—Min | or Gas | Lift | flow JTU |
| Formulation A | 30 | ½ | 2 | Air | Good | 55/150 |
| Formulation B | 20 | ½ | 2 | Air | Good | 90/150 |

I claim:

1. A flotation process of clarifying an aqueous system containing oils, solids, or combinations thereof, characterized by the use of a flotation aid selected from the group consisting of water soluble zirconium salts which form zirconium-oxygen bonds in aqueous solution and zirconium-organic compound complexes.

2. The process of claim 1 where said flotation aid is a zirconium-organic compound complex wherein said organic compound contains an amino group.

3. The process of claim 2 where said flotation aid is a complex of $ZrOCl_2$ and said amino group-containing organic compound.

4. The process of claim 3 where said amino group-containing compound is a cationic acrylic-type polymer.

5. The process of claim 2 where said amino group-containing organic compound is an amino group-containing polymer.

6. The process of claim 1 where said flotation aid is $ZrOCl_2$.

7. The process of claim 4 wherein said flotation aid is introduced into said system and mixed therewith, and the mixture is thereafter allowed to stand quiescent.

8. The process of claim 4 wherein said flotation aid is introduced into said system and mixed therewith, and a gas is introduced into the system in a manner to produce small gas bubbles within the system.

9. The process of claim 1 wherein said flotation aid is introduced into said system and mixed therewith, and the mixture is thereafter allowed to stand quiescent.

10. The process of claim 9 where said flotation aid is a zirconium-organic compound complex wherein said organic compound contains an amino group.

11. The process of claim 9 where said flotation aid is $ZrOCl_2$.

12. The process of claim 9 where said flotation aid is a complex of $ZrOCl_2$ and said amino group-containing organic compound.

13. The process of claim 9 where said flotation aid is a zirconium-organic compound complex wherein said amino group-containing organic compound is an amino group-containing polymer.

14. The process of claim 1 wherein said flotation aid is introduced into said system and mixed therewith, and a gas is introduced into the system in a manner to produce small gas bubbles within the system.

15. The process of claim 14 where said flotation aid is a zirconium-organic compound complex wherein said organic compound contains an amino group.

16. The process of claim 14 where said flotation aid is $ZrOCl_2$.

17. The process of claim 14 where said flotation aid is a complex of $ZrOCl_2$ and said amino group-containing organic compound.

18. The process of claim 14 where said flotation aid is a zirconium-organic compound complex wherein said amino group-containing organic compound is an amino group-containing polymer.

* * * * *

UNITED STATES PATENT AND TRADEMARK OFFICE
CERTIFICATE OF CORRECTION

PATENT NO. : 4,348,287
DATED : September 7, 1982
INVENTOR(S) : Fred W. Jenkins

It is certified that error appears in the above—identified patent and that said Letters Patent is hereby corrected as shown below:

Col. 2, line 4: "Polalkanolamines" should be --- Polyalkanolamines ---.

Col. 2, line 18: "aove" should be --- above ---.

Col. 2, line 60: "0822" should be --- 08822 ---.

Col. 3, line 58: "sould" should be --- should ---.

Col. 4, line 15: "Door" should be --- Dorr ---.

Col. 5, line 32: "simmer" should be --- skimmer ---.

Col 6, line 63: "DMAENA" should be --- DMAEMA ---.

UNITED STATES PATENT AND TRADEMARK OFFICE
CERTIFICATE OF CORRECTION

PATENT NO. : 4,348,287
DATED : September 7, 1982
INVENTOR(S) : Fred W. Jenkins

It is certified that error appears in the above—identified patent and that said Letters Patent is hereby corrected as shown below:

Col. 7, line 5: "WELCO" should be --- WEMCO ---.

Signed and Sealed this

Fourteenth Day of June 1983

[SEAL]

Attest:

DONALD J. QUIGG

Attesting Officer

Acting Commissioner of Patents and Trademarks